Feb. 3, 1970

J. E. MORSE 3,492,728

FILM MARKING STYLUS

Filed Dec. 26, 1967

INVENTOR.
JOHN E. MORSE
BY John W. Husser
Robert W. Hampton
ATTORNEYS

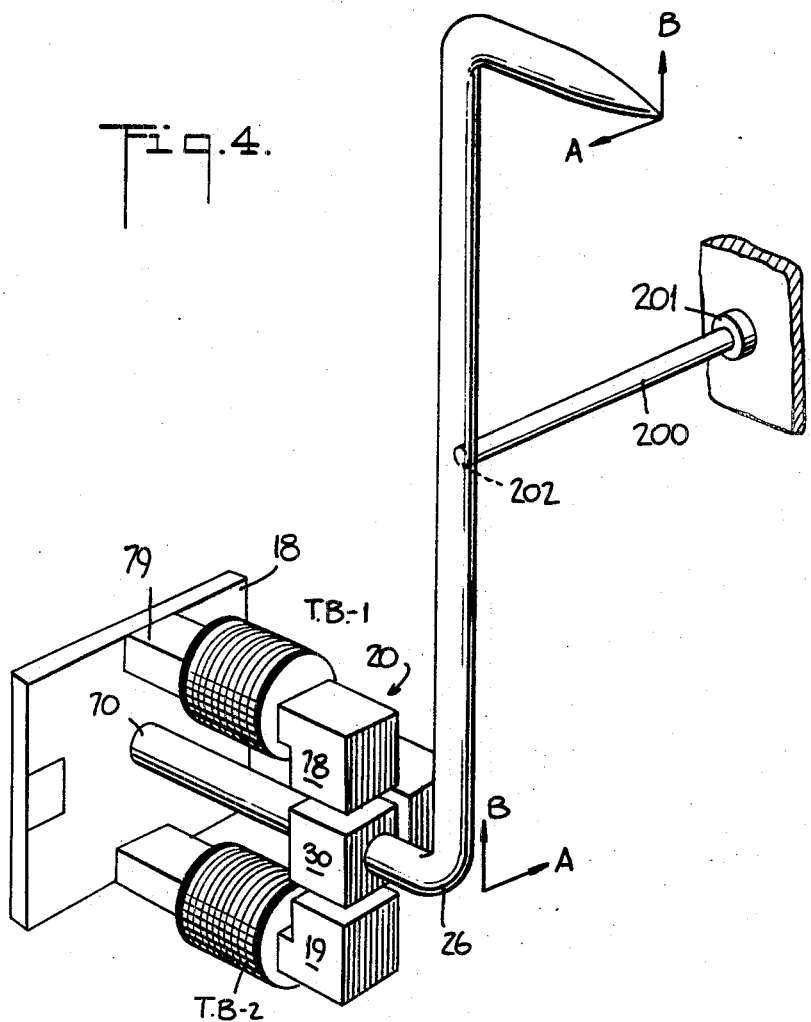

United States Patent Office 3,492,728
Patented Feb. 3, 1970

3,492,728
FILM MARKING STYLUS
John E. Morse, Rochester, N.Y., assignor to Eastman Kodak Company, Rochester, N.Y., a corporation of New Jersey
Filed Dec. 26, 1967, Ser. No. 693,317
Int. Cl. B43l 13/00
U.S. Cl. 33—18    8 Claims

ABSTRACT OF THE DISCLOSURE

A film marking stylus has a tapered point at one end to form a mark on a film frame. An armature is located on the stylus and four electro-magnets are positioned in quadrature to surround the stylus armature. By selectively energizing one or more of the four electro-magnets which surround the stylus armature the stylus armature can be moved to follow a particular path, marking the particular path on the film.

BACKGROUND OF THE INVENTION

Field of the invention

This invention is for inscribing distinctive identification markings on a surface. Although useful wherever such markings are required, it is described as having particular utility in placing a mark or marks on a film frame while the frame is being projected.

In the use of image bearing film it is often desirable, when viewing the film to be able to place different marks on the film. For example, in using microfilm containing information, marking of the viewed film can be used to change or add information, i.e., to update the film frame. Similarly, it is sometimes desirable to be able to place a mark or marks identifying the content of information on a viewed microfilm frame. Thereafter, the microfilm file can be scanned and such identifying marks used by the operator to locate the frames of the microfilm which contain particular information.

Description of the prior art

One prior art method for marking microfilm comprises the use of dyes which are applied to the microfilm. The use of dyes for this purpose involves some disadvantages in that dyes are not readily visible on an opaque surface and do not instantly dry when applied to the film. Additionally, such dyes frequently dry in their storage container, further limiting their use for film marking. Another prior art marking technique involves the punching of holes in the film; however, such procedures are necessarily destructive to a film record file and the holes create difficulties in the handling of the film. Recently a technique of marking film has been developed in which a film marking stylus is connected to a manually operable control member by means of a pantograph linkage. This manual marking technique is relatively slow and, for marks of any complexity, requires a degree of operator skill.

SUMMARY OF THE INVENTION

It is therefore an object of the present invention to provide improved means to mark film.

It is another object of the present invention to provide an improved apparatus for placing additional information on film.

Another object of the present invention is to provide an improved means for updating film record files.

Still another object of the present invention is to provide an electrically controlled film marking stylus.

Yet another object of the present invention is to provide electrical circuitry which controls the movement of a film marking stylus so as to move the marking stylus selectively through a plurality of different paths for placing desired marks on the film.

A further object of the present invention is to provide an efficient film marking apparatus that can be economically made.

Briefly, the objects of the invention are accomplished by apparatus comprising a magnetic stylus to be placed in contact with a surface, and magnetic means for moving the stylus in a plurality of selectable paths to cause it to inscribe selectable identification markings on the surface when in contact with it.

BRIEF DESCRIPTION OF THE DRAWINGS

Other objects and features of the present invention will be readily apparent from the following description and drawings in which:

FIG. 4 is a modified form of the invention as shown in FIGS. 1–2.

DESCRIPTION OF THE PREFERRED EMBODIMENTS

Figure 1:
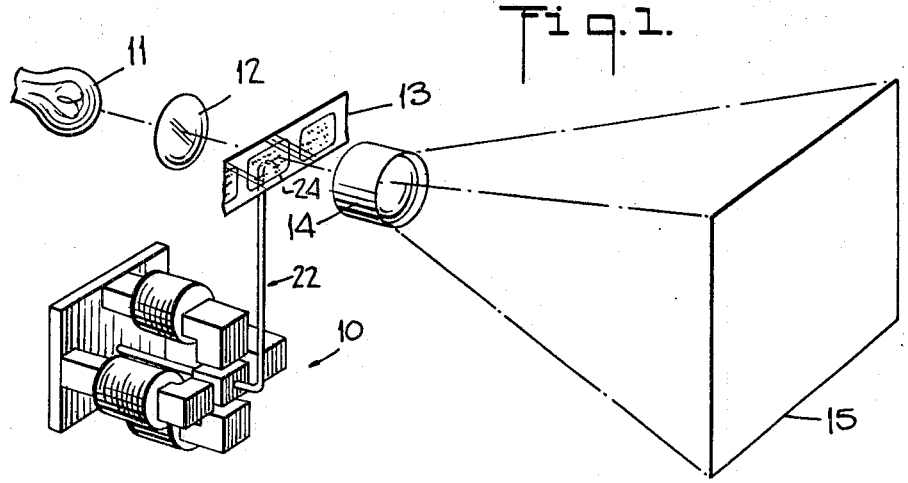
FIG. 1 is a schematic representation of a preferred embodiment of a part of the apparatus of the invention.

In FIG. 1 a condenser 12 is shown having a light source 11 on one side thereof and a microfilm section 13 on the opposite side thereof. A projection lens 14 is positioned adjacent microfilm 13 and an image screen 15 is positioned at an appropriate distance from projection lens 14. (So far what I have described is a standard microfilm reading device and is not a part of the present invention.) The film marking apparatus 10 of the present invention includes a stylus 22 having a tapered section 24 which can be in touching relation with microfilm 13 on its emulsion side. The film marking stylus 22 is more completely shown in FIG. 2 and all further reference to the film marking stylus shall be directed to FIG. 2.

Figure 2:
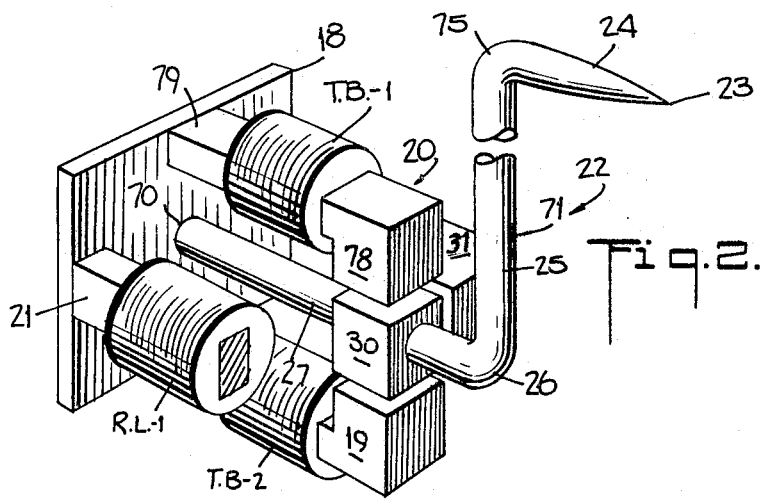
FIG. 2 is an enlargement of the marking apparatus shown in FIG. 1.

In FIG. 2 film marking stylus 22 comprises a solid cylindrical member 25 having a shape generally as shown. A plate 18, preferably of steel or other such magnetic material, has a hole 70 of approximately the same diameter as cylindrical member 25 and into which a base portion 27 of stylus 22 is press-fitted. A middle section 71 of member 25 is perpendicular to base portion 27 due to right angle bend 26. A tapered section 24 is perpendicular to middle section 71 due to a second right angle bend 75. Tapered section 24 ends in a point 23 at its outermost extremity for a reason soon to be apparent. Positioned adjacent to right angle bend 26 on base portion 27 of stylus 22 is an armature 30 of known construction. Extending from base plate 18 are four identical poles (19, 20, 21, 31) having suitable magnetic properties. The poles can be made integral with base plate 18 or joined thereto by any of the known means available. As can be seen from FIG. 2, poles 19, 20, 21 and 31 are positioned in quadrature with respect to base portion 27 of stylus 22 with pole 20 being directly above base portion 27 while pole 19 is directly below base portion 27. Pole 21 is directly to the left of base portion 27 of stylus 22 while pole 31 is directly to the right of base portion 27 looking from the front of the device shown in FIG. 2. Since all the poles are identical to each other a description of one pole will be sufficient for an understanding of the invention. Pole 20 is generally L shaped with a longer part 79 of the L joined to or integral with base plate 18 and a shorter part of the L 78 extended to be adjacent to armature 30. (A complete showing of pole 21 is not shown in FIG. 2 in order to provide a cutaway view in FIG. 2.) Each pole has a coil surrounding it with a first coil surrounding pole 20 and being labelled T–B 1, a second coil surrounding pole 21 and labelled R–L 1, a third coil surrounding pole 19 and labelled T–B 2 and a fourth coil (not shown) surrounding pole 31 and identified as R–L 2, with T–B standing for top-bottom and R–L right-left.

Figure 3:
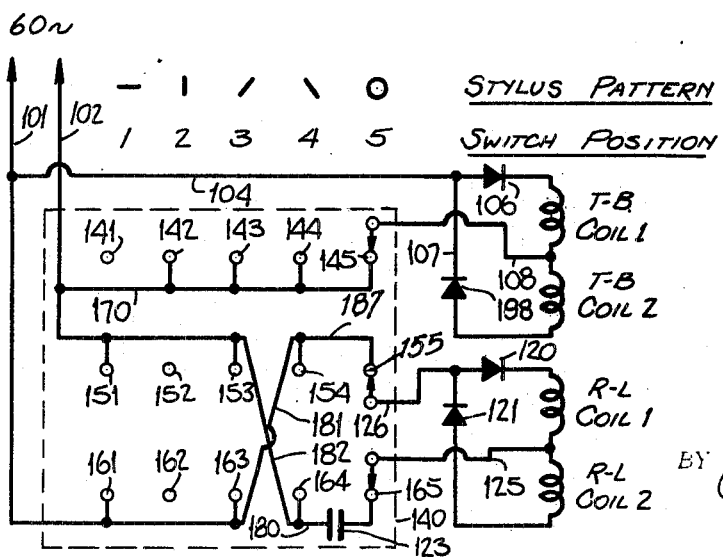
FIG. 3 is a schematic representation of electrical circuitry for controlling the apparatus of FIGS. 1 and 2.

In FIG. 3, one circuit for thus controlling the vibration of stylus 22 is shown as including a first input conductor 102 and a second input conductor 101 both adapted to be connected to a standard alternating voltage source. A conductor 104 provides a low conductive path from conductor 101 to coil T–B 1 through a first diode 106 having a directionality as shown in FIG. 3. A conductor 107 is interconnected between conductor 104 and coil T–B 2 through a second diode 198 which has a directionality as shown. Coils T–B 1 and T–B 2 are in series with each other and a conductor 108 taps the center of the coils to a five-position three-pole switch 140 which is shown in dotted lines. Switch 140 has a first group of contact points 141–145 with all the contact points being connected to conductor 170, which is connected to conductor 102, with the exception of contact point 141 which, when connected to conductor 108, disconnects conductor 108 from conductor 170. A second group of contact points 151–155 is shown with contact points 151 and 153 connected to conductor 102. Contact 152 is an open point like contact point 141 and when connected to conductor 126, disconnects conductor 126 from conductor 102. Conductor 126 connects any of contact points 151–155 with coil R–L 1 by a third diode 120 having a directionality as shown. Contact points 154 and 155 are connected to a conductor 187. A third group of contact points 161–165 has contact points 161 and 163 connected to conductor 101. Contact points 164 and 165 are connected to conductor 180 which has a capacitor 123 between contact points 164 and 165. Contact point 162 is an open contact point like contact points 152 and 141. Conductor 187 is connected to the conductor 101 by conductor 181 while conductor 102 is connected to conductor 180 by conductor 182. Coils R–L 1 and R–L 2 are in series and conductor 125 is tapped between the coils and adapted to be connected to any of contact points 161–165. Coil R–L 2 is connected to conductor 126 by a fourth diode 121 having a directionality as shown.

Five-position three-pole switch 140 in switch position 1 connects conductor 108 to contact point 141, conductor 126 to contact point 151 and conductor 125 to contact point 161. In switch position 2, conductor 108 is connected to contact point 142, conductor 126 is connected to contact point 152 and conductor 125 is connected to contact point 162. In switch position 3, conductor 108 is connected to contact point 143, conductor 126 is connected to contact point 153 and conductor 125 is connected to contact point 163. Switch positions 4 and 5 are apparent from FIG. 3. Switch position 1 will produce stylus vibrations which will mark the microfilm with a horizontal mark as shown in FIG. 3. The other marks that will be produced for the different switch positions can readily be seen from FIG. 3.

The purpose of the various elements (armature 30; poles 19, 20, 21 and 31; and coils T–B 1, R–L 1, T–B 2, and R–L 2) and the circuit of FIG. 3 is to cause stylus 22 to vibrate with selectable vibration components in the top-bottom and right-left directions when the coils are selectably energized by pulsating current. That is to say that stylus 22 can be made to vibrate with vibration components of selectable magnitudes in the direction of two quadrature axes through base portion 27 of stylus 22, those axes being the vertical line between poles 19 and 20 and the horizontal line between poles 21 and 31. Point 23 of stylus 22 can therefore be made to move in a wide variety of paths or patterns depending upon the frequencies, phases and magnitudes of the currents in the coils T–B 1, R–L 1, T–B 2, and R–L 2. Such paths or patterns may, for example, be a vertical straight line in the direction of the vertical quadrature axes, a horizontal straight line in the direction of the horizontal axis, straight lines diagonally between the axes, a circle, an elipse, or other distinctive figure. The manner in which such paths or pattern is determined by the frequencies, phases and magnitudes of the currents in the coils T–B 1, R–L 1, T–B 2, and R–L 2, will be well understood in the electrical arts. Similar paths and patterns in the art of oscilloscopes have been referred to as "lissajou" patterns.

Operation of preferred embodiment

Normally, when it is desired to mark the microfilm, stylus 22 will be moved adjacent the microfilm so point 23 will be touching the microfilm on its emulsion side. This could be done by any of several ways, one being to use a solenoid to move base plate 18 towards the microfilm until stylus point 23 touches the film. If it is desired to have stylus point 23 produce a horizontal line on the microfilm, switch 140 is thrown to position 1 with conductor 108 connected to contact point 141, conductor 126 connected to contact point 151 and conductor 125 connected to contact point 161. Since contact point 141 is not connected to conductor 102 there will be an open circuit with regard to coils T–B 1 and T–B 2 and thus neither will be excited. When a positive voltage is applied to conductor 102 the current will pass through contact point 151, conductor 126 and diode 120 to excite coil R–L 1. The current from coil R–L 1 will be shunted by center tap 125 to contact point 161 and conductor 101. When conductor 101 is at a positive voltage the current will pass from contact point 161 to conductor 125 to excite coil R–L 2 from where the current will be directed to conductor 102 by diode 121, conductor 126 and contact point 151. Diode 120 will prevent the current from conductor 215 from passing through coil R–L 1 instead of coil R–L 2. As this cycle repeats itself, armature 30 will be alternately drawn to poles 21 and 31 with stylus 22 being slightly bent each time due to the excitations of coils R–L 1 and R–L 2 and the resulting magnetic fields. This will vibrate stylus 22 and point 23 in a right-left direction making a horizontal mark on the microfilm.

In switch position 2 conductors 126 and 125 will be connected to open contact points 152 and 162, respectively, while conductor 108 will be connected to contact point 142. This will stop coils R–L 1 and R–L 2 from being energized since contact points 152 and 162 are not connected to conductors 102 and 101. Coil T–B 1 and T–B 2 will be alternately energized in a manner identical to the alternate excitation of coils R–L 1 and R–L 2 when switch 140 is in position 1. The alternating excitation of coils T–B 1 and T–B 2 will move armature 30 alternately towards poles 20 and 19 to have stylus point 23 move up and down or from top to bottom to produce a vertical mark on the microfilm.

In switch position 3 conductor 108 will be connected to contact point 143, conductor 126 will be connected to contact point 153 and conductor 125 will be connected to contact point 163. If a positive pulse is applied to conductor 102 coil T–B 2 will be energized as previously described. Current will also pass from conductor 102, by contact point 153, to conductor 126 and through diode 120 to excite coil R–L 1. The current from coil R–L 1 will be shunted to conductor 101 by conductor 125 and contact point 163 to bypass coil R–L 2. When conductor 101 receives the positive pulse coil T–B 1 will be energized by current passing through conductor 104 and diode 106. The current passing through coil T–B 1 will be conducted to conductor 102 by conductor 108, contact point 143 and conductor 170. The current in conductor 101 will pass through contact point 163 to conductor 125 to excite coil R–L 2. The current from coil R–L 2 will be returned to conductor 102 by diode 121, conductor 126 and contact point 153. Thus it can be that coils T–B 1 and R–L 2 will be simultaneously energized in one part of the cycle and coils T-B 2 and R-L 1 simultaneously energized in the other part of the cycle. When the coils T-B 1 and R-L 2 are energized armature 30 and stylus 22 will be bent upwards and to the right to a point equidistant from poles 20 and 31. When coils T-B 2 and R-L 1 are energized stylus 22 will be drawn downwards and to the left to a point equidistant from poles 21 and 19. This will result in an oblique path for stylus point 23 forty-five degrees from the horizontal and an identical mark on the microfilm.

When switch 140 is thrown to position 4 conductor 108 will be connected to contact point 144, conductor 126 will be connected to contact point 154 and conductor 125 connected to contact point 164. Switch position 4 will allow coils T-B 1 and R-L 1 to be simultaneously energized and coils T-B 2 and R-L 2 to be alternately simultaneously energized in a manner opposite from switch position 3. This will cause the stylus to continuously vibrate along a path defined by a point equidistant from poles 20 and 21 and a point equidistant from poles 19 and 31. Stylus point 23 will trace out an oblique line in the microfilm one hundred and thirty-five degrees from the horizontal as shown in FIG. 3.

When switch 140 is thrown to position 5, as shown in FIG. 3, the stylus point will trace a circular path on the microfilm. A positive pulse applied to conductor 102 will direct current through contact point 145, conductor 108 to energize coil T-B 2 and to conductor 104 and conductor 101. Current will pass from conductor 102 by conductor 182 through capacitor 123 to conductor 125 to energize coil R-L 2. Since capacitor 123 is in series with coil R-L 2 there will be a 90° phase shift in the line current fed to coil R-L 2. This will allow coil R-L 2 to be energized before coil T-B 2. When conductor 101 is pulsed, coil T-B 1 will be energized as previously described. Current will pass from conductor 101 through conductor 181 to conductor 126 and diode 120 to energize coil to R-L 1. Coil R-L 1 is in series with capacitor 123 by conductor 125 and there will be a 90° phase shift in the line current energizing coil R-L 1 allowing coil R-L 1 to be energized slightly before coil T-B 1. Thus with switch 140 in position 5 the coils will be energized in the following sequence: T-B 2, R-L 1, T-B 1 and R-L 2. This will draw stylus 22 to poles 19, 21, 20 and 31 sequentially which will result in a circular motion for stylus point 23 and a circular mark on the microfilm.

The gooseneck offset in the stylus, as seen in FIGS. 1 and 2, might produce unwanted sideways motion due to possible twist of bar 27. To avoid this problem I have joined flexible support rod 200, referring to FIG. 4 which is an open view of the invention, to the marking stylus at a point 202 which is about midway the stylus length. Flexible support rod 200 is rigid in compression and is mounted by means 201 to a fixed support such as the machine frame or base plate 18. If the coils are energized to produce horizontal motion of the stylus point the stylus will pivot about point 202 so that if the bottom of the stylus is moving in a horizontal direction indicated by A, the top will move in the opposite horizontal direction as indicated by A. This occurs since support rod 200 is rigid in compression and thus acts as a fulcrum for the stylus to pivot when the coils are energized to move the stylus in a horizontal direction. When the coils are energized to move the stylus in a vertical direction both the top and bottom of the stylus will move in the same direction as indicated by the directions arrows B at the top and bottom of the stylus. This is possible because flexible support 200, while rigid in compression, is flexible and thus will flex up and down with the stylus.

Typically, film includes opaque and clear portions. Marking of a film by the stylus point will produce visible marks in the opaque part of the film by removing part of the opaque material allowing light to pass through. The mark is visible in a clear area of film since scratching the clear emulsion causes a disruption of the light passing through the film in the scratched area. While I have shown a certain geometrical configuration of stylus 22, it should be apparent that other configurations of stylus 22 could be used.

The invention has been described in detail with reference to preferred embodiments thereof, but it will be understood that variations and modifications can be effected within the spirit and scope of the invention as described hereinabove and as defined by the appended claims.

I claim:
1. Apparatus for inscribing a surface with distinctive identification markings, said apparatus comprising:
 (a) a stylus for marking the surface,
 (b) first, second, third and fourth magnetic means disposed with respect to said stylus to impart movement along a first axis as defined by the positions of said first and third magnetic means and along a second axis as defined by the positions of said second and fourth magnetic means, and
 (c) switching means for selectively applying to said first, second, third and fourth magnetic means an alternating electrical signal of selected phase and amplitude to impart to said stylus movement having components along said first and second axes to inscribe selectable patterns on the surface.

2. Apparatus as claimed in claim 1, wherein said first and third magnetic means are connected in series, said second and fourth magnetic means are connected in series, first and second diodes being connected respectively to said first and third magnetic means in opposite directions to facilitate the alternative energization of said second and fourth magnetic means.

3. Apparatus as claimed in claim 1, wherein said switching means comprises a switching assembly including first, second and third contact groups, each of said contact groups including a plurality of contacts and a contact member for selectively being connected with each of said contacts, said contact members of said first, second and third contact groups being mechanically connected for joint movement.

4. Apparatus as claimed in claim 2, wherein there is included first and second terminal points, said first and third magnetic means being connected in series at a first point, a first diode disposed in a forward biasing direction for interconnecting said first terminal point and said first magnetic means, a second diode disposed in a reverse biasing direction to interconnect said first terminal point and said second magnetic means, a first point of interconnection between said first and second magnetic means, being connected to said contact member of said first group.

5. Apparatus as claimed in claim 3, wherein said second and fourth magnetic means are connected in series at a second point of interconnection, a third diode disposed in a forward biasing direction to interconnect said contact member of said second group and said second magnetic means, a fourth diode disposed in a reverse biasing direction to interconnect said contact member of said second group to said fourth magnetic means, said second point of interconnection being connected to said contact member of said third group.

6. Apparatus as claimed in claim 5, wherein said first, second and third contact groups each include first, second, third, fourth and fifth contacts.

7. Apparatus as claimed in claim 6, wherein said second, third, fourth and fifth contacts of said first contact group are connected by a low conductive path to said second terminal point, said first and third contacts of said second contact group and said fourth and fifth contacts of said third contact group being connected by a low conductive path to said second terminal point, and said first and third contacts of said third contact group and said fourth and fifth contacts of said second group being connected to said first terminal point, said first contact of said first contact group and said second contacts of said second and third contact groups being isolated from said first and second terminal points.

8. Apparatus for inscribing a surface with distinctive identification markings, said apparatus comprising:
(a) a stylus for marking the surface,
(b) first, second, third and fourth electromagnets disposed about said stylus at angles of substantially 90° from each other, and
(c) switching means coupled to said first, second, third and fourth electromagnets for selectively applying alternating potential signals of selected phase and amplitude to impart to said stylus movements to inscribe selectable patterns on the surface.

References Cited

UNITED STATES PATENTS

| 2,141,964 | 12/1938 | Yonkers | 346—77 X |
| 3,087,772 | 4/1963 | Ascoli. | |

FOREIGN PATENTS 679,784  9/1952  Great Britain.

HARRY N. HAROIAN, Primary Examiner

U.S. Cl. X.R.

353—44